…

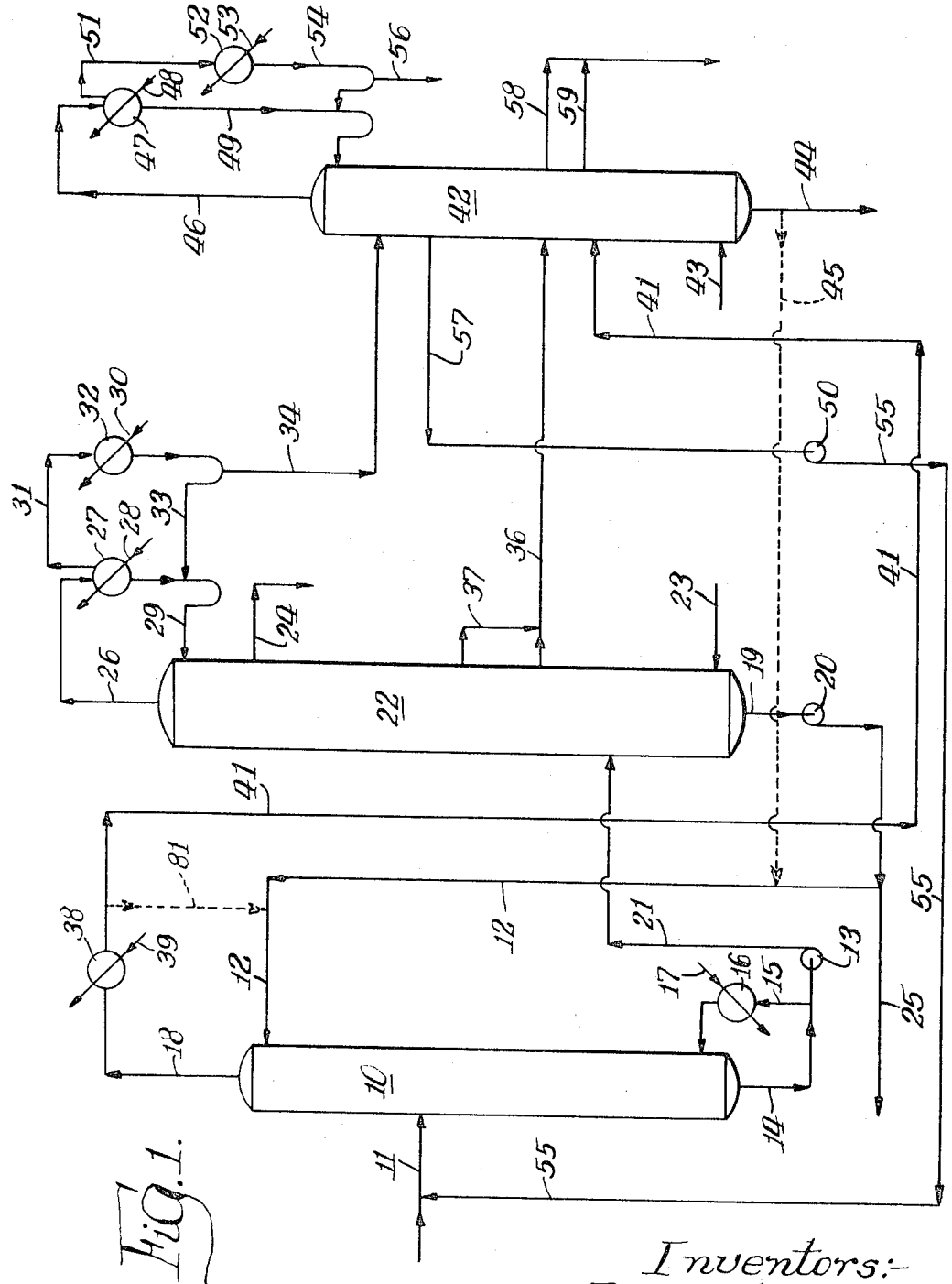

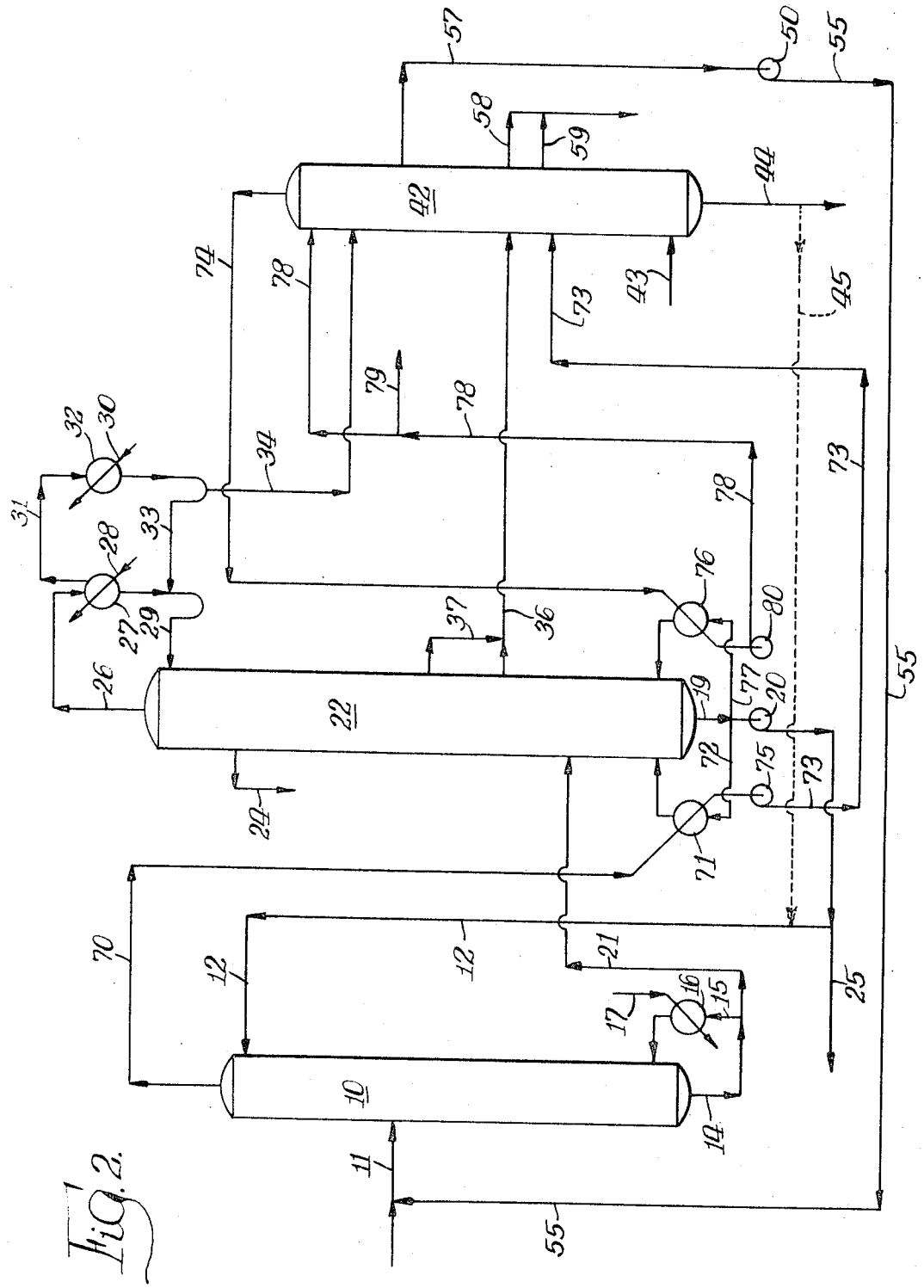

United States Patent Office 3,445,345
Patented May 20, 1969

3,445,345
EXTRACTIVE DISTILLATION OF $C_1$ TO $C_3$ ALCOHOLS AND SUBSEQUENT DISTILLATION OF PURGE STREAMS
Raphael Katzen, Vincent B. Diebold, and George D. Moon, Jr., Cincinnati, Ohio, assignors to Raphael Katzen Associates, a partnership
Filed May 8, 1968, Ser. No. 727,540
Int. Cl. C07c 29/30; B01d 3/40
U.S. Cl. 203—25  10 Claims

ABSTRACT OF THE DISCLOSURE

A crude alcohol-containing mixture comprising a saturated aliphatic alcohol of not more than 3 carbon atoms and associated impurities is processed in a three-tower distillation system to permit recovery of the desired alcohol product in highly concentrated and purified form. In the first tower the crude feed is subjected to extractive distillation with water to remove substantially all the impurities overhead. An aqueous bottoms stream from the first tower containing 5 to 10 wt. percent alcohol and only minor amounts of impurities is fed to the second tower where the alcohol product is concentrated and recovered. Overhead and intermediate purge streams containing low boiling and high boiling impurities are removed from the second tower and are fed to the third tower along with the overhead from the first tower. The impurities are recovered as by-products from the third tower, and an alcohol stream is recycled from the third tower to the first tower. Water may be recycled from the bottoms of the second and third towers to the first tower. Multiple pressure level operation may be used for heat economy.

---

This invention relates to a novel and improved process for recovering water soluble aliphatic alcohols in highly concentrated and purified form from crude alcohol-containing mixtures. More specifically, the invention relates to a novel multiple stage distillation process for the recovery of saturated aliphatic alcohols having not more than 3 carbon atoms, namely, methanol, ethanol, normal propanol, and isopropanol.

The water soluble saturated aliphatic alcohols are obtained principally by three methods: (1) carbonization or destructive distillation of wood to yield methanol; (2) fermentation of appropriate materials to obtain ethanol or normal propanol; and (3) various synthesis reactions to obtain methanol, ethanol, normal propanol, or isopropanol. The crude product obtained by any of these methods contains numerous organic by-products or impurities in addition to the desired alcohol component. Many different procedures have been investigated and used for recovering the desired alcohol in concentrated and purified form from the crude alcohol-containing mixture. Usually, the desired separation is effected by distillation or some combination of distillation, extraction and adsorption procedures. In the case of ethanol recovery, the Barbet process is conventionally used but has well-known disadvantages. Thus, there is still a marked need for a simple recovery system for ethanol and other water soluble saturated aliphatic alcohols which will afford a higher purity alcohol product with a minimum loss of such product and at a reduced operating cost as compared with known methods.

Accordingly, a primary object of this invention is to provide a novel and improved alcohol recovery process which affords substantial advantages over known methods, particularly with respect to the concentration and purity of the recovered alcohol product and the cost of operation.

A more specific object of the invention is to provide a novel and improved process for recovering from a crude alcohol-containing mixture a high yield of a water soluble saturated aliphatic alcohol as a first-grade product with a lower impurity content than has heretofore been achieved.

A further object of the invention is to provide a novel and improved process of the aforementioned character utilizing a relatively simple multiple stage distillation system having a minimum number of distillation towers and a minimum amount of auxiliary equipment.

Another object of the invention is to provide a novel and improved multiple stage distillation process of the foregoing type which is further characterized by reduced energy requirements in the form of steam or other thermal energy source.

Still another object of the invention is to provide a novel and improved process for the recovery of ethanol from crude ethanol-containing mixtures.

Other objects and advantages of the invention will become apparent from the subsequent detailed description taken in conjunction with the accompanying drawings, wherein:

FIG. 1 is a schematic flow diagram illustrating one specific embodiment of the invention utilized for the recovery of ethanol; and FIG. 2 is a schematic flow diagram showing a modification of the system illustrated in FIG. 1.

Briefly described, our invention utilizes a three tower or three column distillation system comprising an extractive distillation tower, a rectifying or alcohol concentrating tower, and an impurities concentrating tower which perform the following functions:

(1) The crude alcohol feed is fed to the middle of the extractive distillation tower and water is fed to the top of the tower. This tower is operated so as to remove the bulk of the impurities in an overhead vapor stream. A dilute alcohol-water stream having an alcohol concentration of from about 5 to about 10 wt. percent and containing only minor or trace amounts of impurities is withdrawn from the bottom of this tower.

(2) The bottoms stream from the extractive distillation tower is fed to the rectifying tower which is operated to strip the desired alcohol product from the water. A concentrated and purified alcohol product is removed from the upper portion of the rectifying tower, and water is withdrawn from the bottom of this tower and may be discarded or recycled to the extractive distillation tower. A purge stream containing low boiling impurities is removed overhead from the rectifying tower, and one or more purge streams containing higher boiling impurities are removed from an intermediate portion of the rectifying tower.

(3) The overhead from the extractive distillation tower and the several purge streams from the rectifying tower are fed to the impurities concentrating tower which is operated so as to remove from an upper portion of the tower an alcohol stream which is recycled and combined with the crude feed to the extractive distillation tower. Low boiling impurities are recovered as an overhead product and high boiling impurities are recovered from a lower portion of the impurities concentrating tower. Stripped water is also withdrawn from the bottom of the impurities concentrating tower for discard or recycle to the extractive distillation tower.

Although the invention is hereinafter described with specific reference to an ethanol recovery system, it is to be understood that the principles of the invention are also applicable to the recovery of methanol, normal propanol, and isopropanol.

Referring now to FIG. 1 of the drawings, the first or extractive distillation tower is designated at 10. A crude ethanol-containing feed stock, such as the crude alcohol obtained by fermentation or synthesis, is fed through a line 11 to the middle portion of the tower 10. In the case of ethanol obtained by fermentation, it will be understood that the fermentation mixture must first be fed to a conventional fore-tower or beer still (not shown) which strips the alcohol and the associated volatile impurities from the grain or molasses solids, yeast cells, and other ingredients of the beer feed. The condensed overhead product from the fore-tower or beer still is then utilized as the crude alcohol feed stock which is fed to the tower 10 through the line 11.

Extraction water is fed to the top of the tower 10 through a line 12, the extraction water comprising primarily a recycle stream obtained in the manner hereinafter described. Heat is supplied at the base of the tower 10 through a heat exchanger or reboiler 16 to part of the bottoms stream circulating through lines 14 and 15 back to the base of the tower 10. Steam is supplied to the heat exchanger 16 through a line 17 in indirect heat exchange relation with the recycled bottoms stream, but it will be understood that the heat requirements of the tower 10 may also be supplied by direct introduction of steam at the base of the tower 10.

The amount of extraction water introduced through the line 12 to the top of the tower 10 and the heat input at the base of the tower 10 must be sufficient so that substantially all of the impurities, both lower boiling and higher boiling, are removed overhead from the tower 10 through a line 18. As is well understood in the art, the presence of the water in the system alters the normal volatilities of the various components so that the impurities having boiling points above that of ethanol are distilled overhead together with the lower boiling impurities. In order to achieve the desired overhead removal of the bulk of the impurities in the feed stream, the relative quantities of feed and extraction water and the heat input at the base of the tower 10 are regulated so that the bottoms stream withdrawn through the line 14 comprises a dilute aqueous alcohol stream having only minor or trace amounts of impurities and an alcohol content within the range of from about 5 wt. percent to about 10 wt. percent which is compatible with recovery of the final ethanol product at the required specification level in a subsequent stage of the process.

The unrecycled portion of the dilute alcohol stream withdrawn from the base of the tower 10 is supplied from the line 14 by means of a pump 13 and a line 21 to a lower tray or portion of a rectifying or alcohol concentration tower 22. Steam is injected directly into the base of the tower 22 through a line 23 in order to strip the desired ethanol product from the water content of the feed introduced to the tower 22. Although direct steam injection is illustrated in the drawing, it will be understood that indirect heating means may also be provided at the base of the tower 22 to accomplish the desired stripping effect. The stripped ethanol is then concentrated in the tower 22 to the desired high concentration level (approaching the ethanol-water azeotrope composition), and a concentrated ethanol product of high purity is withdrawn and recovered through a line 24 near the top of the tower 22 as the final ethanol product of the process.

A "pasteurizing" or volatile fraction concentrating section in the tower 22 above the point of withdrawal of the ethanol product through the line 24 permits the accumulation and removal at low concentration levels of the lower boiling more volatile impurities or "heads" from the top of the tower 22 through a line 26. The vapors removed through the line 26 are condensed in a first condenser 27 which is supplied with cooling water through a line 28. The condensate from the condenser 27 is returned as reflux through a line 29 to the top of the tower 22. Uncondensed volatile impurities are removed through a line 31 from the condenser 27 and are supplied to a vent condenser 32 which is cooled through a line 30 either with cooling water or a refrigerant, depending upon the desirability of recovering the more volatile impurities such as diethyl ether and acetaldehyde (or other impurities such as dimethyl ether, formaldehyde, acetone, and the like, in the case of other alcohol recovery systems). The condensate from the vent condenser 32 may be returned in part as reflux to the tower 22 through a line 33 communicating with the line 29, but the remainder is removed as a purge stream through a line 34 for further processing as described below. In some cases the vent condenser 32 may be omitted, in which case a portion of the condensate stream in line 29 is withdrawn as the purge stream. By removing the purge stream continuously and preferably at a steady rate, the volatile or lower boiling impurities are not permitted to accumulate to any significant extent at the point in the tower 22 where the ethanol product stream 24 is withdrawn, and the desired ethanol product is recovered through the line 24 at a very low concentration level of volatile impurities amounting to a few parts per million.

Stripped water is withdrawn from the bottom of the tower 22 through a line 19 and is recycled by a pump 20 through the line 12 to the top of the tower 10 as previously indicated. A portion of the withdrawn water is discarded to waste through a line 25.

In addition to the overhead purge stream withdrawn through the line 34 from the rectifying tower 22, one or more intermediate purge streams containing higher boiling impurities are also removed from an intermediate portion of the tower 22 between the feed line 21 and the ethanol product withdrawal line 24. The appropriate trays or points of withdrawal of the purge streams of higher boiling impurities may be selected in a well-known manner by tray composition calculations to determine the points of accumulation in the tower 22 of the higher boiling impurities, including azeotropes of these higher boiling impurities with water. Typical of such higher boiling impurities are the higher alcohols, such as butyl and amyl alcohols, as well as various aldehydes, ketones, esters, and hydrocarbons. Since the different higher boiling impurities may concentrate at several intermediate levels in the tower 22, the withdrawal of multiple purge streams is preferred to permit removal of these impurities continuously, and preferably at steady rates, thereby avoiding accumulation of the same.

In FIG. 1, removal of purge streams of higher boiling impurities from two different levels in the tower 22 is indicated by the line 36 and by the line 37 which merges with the line 36. By thus preventing accumulation of the higher boiling impurities in the tower 22, the amounts of these impurities forced up the tower 22 into the region of the ethanol product withdrawal line 24 is kept to a minimum, and the product alcohol removed through the line 24 has a very low content of higher boiling impurities (conventionally identified as "fusel oils"), for example, less than 30 parts per million and in many cases as low as 10 parts per million.

Preferably, the amount of each purge stream withdrawn through the lines 34 and 36 should be from about 0.1 to about 5 wt. percent of the ethanol product stream recovered from line 24.

The overhead impurities stream comprising both lower boiling and higher boiling impurities removed through the line 18 from the top of the extractive distillation tower 10 is condensed in a condenser 38 supplied with cooling water through a line 39, and the resultant condensate passes through a line 41 and is fed into the lower portion of an impurities concentrating tower 42. Likewise, the multiple purge streams of higher boiling impurities are fed from the tower 22 through the line 36 to the lower portion of the tower 42. In addition, the overhead purge stream comprising lower boiling impurities removed from the tower 22 are introduced through the line 34 into the upper portion of the tower 42. Stripping steam is supplied directly to the base of the tower 42 through a line 43, although it will be understood that indirect heating methods may also be utilized at the base of the tower 42 just as in the case of the towers 10 and 22. The operation of the tower 42 is controlled so as to strip ethanol and the impurities from the water content of the various feeds to the tower so that water which is essentially alcohol-free may be withdrawn from the base of the tower 42 through a line 44 for discard. If desired, all or a portion of this withdrawn water may be returned, as indicated by the broken line 45, to the line 12 and thus recycled to the tower 10.

In the tower 42 the more volatile or lower boiling impurities are concentrated as "heads" near the top of the tower and are removed overhead through a line 46 and are passed to a condenser 47 which is supplied with cooling water through a line 48. The resultant condensate is returned as reflux through a line 49 to the top of the tower 42. The uncondensed components of the overhead stream from the tower 42 are removed from the condenser 47 through a line 51 to a vent condenser 52 which is supplied by a line 53 either with cooling water or a suitable refrigerant, dependent upon whether or not it is desired to recover the more volatile impurities as heretofore mentioned in connection with the treatment of the overhead from the tower 22. The condensate from the vent condenser 52 is withdrawn through a line 54 and may be combined in part, if desired, with the reflux from the line 49 introduced to the top of the column 42. The remainder of this condensate is recovered through a line 56 as a "heads" by-product. In this tower also the vent condenser 52 may be omitted in some cases, in which event a portion of the condensate in line 49 may be withdrawn as the "heads" by-product.

The ethanol content of the several impurity feed streams to the tower 42 concentrates in the upper portion of the tower 42 and is withdrawn through a line 57. This stream is recycled by a pump 50 and a line 55 to the feed line 11 and is thus combined with the crude alcohol feed and returned to the extractive distillation tower 10 for recovery of its alcohol content and re-separation of impurities therefrom. Preferably, the alcohol stream recycled through the lines 57 and 55 should contain from about 60 wt. percent to about 90 wt. percent ethanol and should constitute at least about 80 wt. percent of the ethanol content of the total ethanol-containing streams fed to the tower 42.

In the tower 42 the higher boiling impurities concentrate at an intermediate portion of the tower between the feed point of the main impurities stream introduced through line 41 and the point of withdrawal of the recycle ethanol stream through the line 57. These impurities are withdrawn preferably from a plurality of levels such as through the line 58 and the line 59 which merges with the line 58. The concentration of higher boiling impurities in the combined stream withdrawn through the line 58 is sufficiently high so that the combined purge stream may be passed to a washer (not shown) and there contacted with an excess of water or aqueous salt solution. The higher boiling impurities comprising alcohols, esters, aldehydes, ketones, and hydrocarbons which are insoluble in the wash water or salt solution separate as an oil-like layer which can be decanted for disposal or for further treatment for by-product recovery. The water layer from the decanting step is returned to the extractive distillation tower 10 for recovery of its alcohol content and for re-separation of any dissolved impurities.

As heretofore described, either the stripped water which is withdrawn from the bottom of the rectifying tower 22 through the line 19, or the stripped water withdrawn from the bottom of the impurities concentrating tower 42 through the line 44, or both streams my be recycled to the line 12 and thence to the top of the extractive distillation tower 10. The temperature of these recycle water streams may be adjusted, by suitable cooling or heating means not shown, in order to obtain the maximum extraction effect in the tower 10 with minimum rectification effect resulting from internal direct contact condensation. For example, the recycle water may be adjusted if necessary to a temperature which is from about 5° F. to about 50° F. below the saturation temperature of water vapor at the pressure existing at the top of the extractive distillation tower 10, and preferably in the range of from about 10° F. to about 30° F. below this level.

By means of the multiple stage distillation system described above we have found that it is possible to recover an ethanol product through the line 24 having a lower impurities content than has heretofore been possible using known alcohol distillation and refining systems such as the Barbet process. Moreover, these results are accomplished with a substantially lower steam consumption than is possible with conventional systems. The principles described above are also applicable to the treatment of other feed stocks for the recovery of other water soluble saturated aliphatic alcohols, namely, methanol and the propanols.

FIG. 2 illustrates a modified embodiment of the invention which utilizes the same general process flow described in connection with FIG. 1, but the various towers are operated at different pressure levels so that the thermal energy from one or more towers which is normally lost in the water-cooled overhead condensers can be utilized to provide a source of heat for one or more of the remaining towers. The portions of the FIG. 2 system which are the same as shown in FIG. 1 are identified by the same reference numerals, and only those features of the FIG. 2 system which differ from FIG. 1 will be described in detail.

In FIG. 1, each of the towers 10, 22, and 42 is operated at substantially atmospheric pressure, but in the FIG. 2 embodiment the extractive distillation tower 10 and the impurities concentrating tower 42 are operated at an elevated pressure of from about 25 to about 100 lbs. per sq. inch gauge, and the rectifying tower 22 is operated at substantially atmospheric pressure. As a result of this difference in operating pressures, the overhead vapors from the extractive distillation and impurities concentrating towers may be condensed in reboilers at the base of the rectifying tower which normally requires the greatest heat input and is, therefore, responsible for the greatest steam consumption in the case of a FIG. 1 system.

Referring to FIG. 2, it will be seen that the overhead impurities stream from the tower 10 is removed through a line 70 and passes through a reboiler or heat exchanger 71 adjacent the base of the rectifying tower 22 in indirect heat exchange relation with a portion of the bottoms stream withdrawn from the base of the tower 22 through the line 19, this portion being recycled from the line 19 through a line 72 and the reboiler 71 and thence returned to the lower portion of the tower 22. The heat content of the overhead impurities stream at elevated pressure in line 70 causes heating of the bottoms stream recycled through the line 72, and the resultant condensed impurities stream is transferred from the reboiler 71 by a pump 75 through a line 73 to the lower portion of the impurities concentrating tower 42.

In a similar manner, the overhead low boiling impurities stream from the tower 42 is withdrawn at elevated pressure through a line 74 and is passed through another reboiler 76 at the base of the tower 22 in indirect heat exchange relation with another portion of the bottoms withdrawal from the tower 22, the latter being recycled from the line 19 through a line 77 and the reboiler 76 and thence back to the base of the tower 22. Thus, the heat content of the overhead elevated pressure streams from the towers 10 and 42 is utilized as a source of thermal energy for the rectifying tower 22 instead of a separate steam supply for the tower 22 as relied upon in the FIG. 1 embodiment. The condensed overhead stream is transferred from the reboiler 76 by a pump 80 through a line 78 and is thus returned in part as reflux to the top of the tower 42, the remaining portion of this stream being recovered through a line 79 as "heads" by-product.

In addition to the particular multiple pressure level operation described in connection with FIG. 2, other variations may also be used. For example, the extractive distillation tower 10 and the impurities concentrating tower 42 may be operated at substantially atmospheric pressure while the rectifying tower 22 is operated under vacuum. Of course, the towers 10 and 42 may also be operated at super-atmospheric pressure with the tower 22 under vacuum. Alternatively, the rectifying tower 22 may be operated at elevated pressure while the towers 10 and 42 are operated at atmospheric pressure or sub-atmospheric pressure so that the heat content of the overhead stream from the rectifying tower can be utilized as a source of heat in reboilers provided at the bases of the towers 10 and 42. As a further alternative, the three towers can be operated at successively different pressure levels ranging from super-atmospheric pressure to atmospheric pressure to sub-atmospheric pressure or vacuum, so that the overhead vapors from the highest pressure tower may be utilized to provide reboiler heat for the next lowest pressure tower, and overhead vapor from the latter are utilized to provide reboiler heat for the third tower. However, it will usually be found that the impurities concentrating tower 42 requires the smallest heat input while the rectifying tower 22 requires the greatest heat input. Thus, the normal balance of heat requirements in the three tower system will ordinarily dictate the use of the two-pressure level system described in connection with FIG. 2 wherein the heat requirements of the rectifying tower 22 are approximately balanced by the total heat requirements of the extractive distillation and impurities concentrating towers 10 and 42.

In either the FIG. 1 embodiment or the FIG. 2 embodiment and its variations a further degree of flexibility and control may be achieved by modifying or varying the liquid feed to the top of the extractive distillation tower 10. For example, as shown in full lines in FIG. 1, the tower 10 may be operated with only extraction water fed through the line 12 to the top of the tower. In such case, the overhead vapors removed through the line 18 contain substantially all of the impurities and a substantial amount of the alcohol from the initial feed, and these vapors are condensed at a low concentration in terms of alcohol and impurities content of the aqueous condensate. This then imposes a substantial load on the impurities concentrating tower 42. As an alternative operation, it may be desirable in some instances to return some of the overhead condensate from the condenser 38, as by means of the broken line 81, as reflux to the top of the tower 10 along with the extraction water introduced through the line 12. However, the water concentration obtained at the top of the tower 10 must be such that the impurities to be removed have a greater relative volatility than ethanol or other desired alcohol product. The result is that the vapors condensed in the overhead condenser 38 yield a condensate of higher concentration in terms of both alcohol and impurities, so that a reduced size stream may be fed through the line 41 to the impurities concentrating tower 42, thereby reducing the required size and heat input for the tower 42. Counterbalancing this, however, is the fact that the heat requirements of the extractive distillation tower 10 may be increased because of the increased stripping requirements due to the refluxing action. The optimum choice between the non-refluxed and refluxed operations of the extractive distillation tower 10 will be determined by an economic balance between equipment requirements and steam consumption.

In the foregoing description, it will be understood that the towers 10, 22, and 42 may comprise conventional fractional distillation columns of the tray or plate type, but packed columns or the like may also be used. It will also be recognized that while only certain of the more important pumps have been illustrated in the flow diagrams comprising FIGS. 1 and 2, additional pumps or fluid handling devices will be required throughout the system as will be readily understood by those skilled in the art.

The following specific examples of the invention as related to ethanol recovery are presented by way of further explanation of the invention but are not to be regarded as limiting examples.

EXAMPLE I

In the production of ethanol or ethyl alcohol from grain, the distillation system of FIG. 1 is employed. The aqueous impure alcohol stream from a beer stripping fore-tower having an ethanol content of approximately 75 wt. percent is fed to an intermediate tray of the extractive distillation tower 10 at a rate of approximately 18 gallons per minute. Extraction water from the base of the rectifying tower 22 is fed through the line 12 at a controlled temperature of approximately 184° F. to the top tray of the extractive distillation tower 10 at a rate sufficient to permit withdrawal through the line 14 of an aqueous alcohol bottoms stream containing about 8 wt. percent alcohol. At the low alcohol concentrations prevailing throughout the tower 10, the relative volatilities of the impurities in the feed stream, with respect to water, exceed that of ethanol, so that these impurities are forced to the top of the tower 10 and are removed as a conednsed aqueous alcohol solution in the line 41 having an alcohol content of approximately 18 wt. percent.

The aqueous alcohol solution leaving the bottom of the extractive distillation tower 10, which is essentially free of impurities, is fed through line 21 to an intermediate tray of the rectifying tower 22 where the ethanol fraction is rectified to 192° proof (93.85 wt. percent) and is removed through line 24 as the ethanol product six trays below the top tray of the tower 22. The tower 22 is operated essentially at total reflux (90:1) above this draw point. Any low-boiling impurities that may have leaked out the base of the extractive distillation tower 10 tend to concentrate in the upper trays of the rectifying tower 22 and are purged from the system by a "heads" draw through the line 34 amounting to about 0.6 gallon per minute. Trace amounts of higher boiling impurities which also may have leaked out the bottom of the extractive distillation tower 10 (for example, higher alcohols) tend to concentrate, because of their non-ideality, near and above the feed zone of the tower 22 and are removed from the system in aqueous alcohol solution from multiple draw points, as at lines 36 and 37, the total of these draws amounting to about 1.5 gallons per minutes of solution containing approximately 62 wt. percent alcohol. Water containing less than about .02 wt. percent alcohol is discharged from the base of the tower 22 and is returned through lines 19 and 12 to the top tray of the tower 10.

The high boiling impurity draws from the lines 36 and 37 are transferred to the intermediate feed point of the impurities concentrating tower 42. The overhead condensate from the extractive distillation tower 10 containing the bulk of the impurities that were in the primary feed stream is also fed through the line 41 to an intermediate tray of the impurities concentrating tower 42. The heads draw stream from the rectifying tower 22 is also fed to the tower 42 through line 34 but is introduced to the tower at a higher tray because of its higher alcohol content. Operating at a reflux ratio of approximately 50 to 1, the tower 42 concentrates low boiling impurities, for example diethyl ether or acetaldehyde, in the upper portion, and these impurities are removed from the system in a "heads" draw through the line 56 amounting to approximately 0.1 gallon per minute and containing approximately 91 wt. percent alcohol. Aside from the inevitable but minor base losses from both the rectifying tower 22 and the impurities concentrating tower 42, this "heads" draw stream 56 represents the only significant alcohol loss in the system. The balance of the alcohol fed into the tower 42 is removed as an 85 wt. percent solution in water (largely free of impurities) and is recycled through the line 57 to the extractive distillation tower 10 for further clean-up. The net water remaining in the system is discharged to waste from the base of the tower 42 through the line 44 and contains no more than about .02 wt. percent alcohol.

Because of their high volatilities with respect to water and their low volatilities with respect to concentrated ethanol solutions, higher boiling impurities, e.g., butyl and amyl alcohols, tend to concentrate in the region of tower 42 slightly above the primary feed point, i.e. the line $\overline{41}$. These are removed continuously from the tower 42 through the multiple side draw connections 58 and 59 in alcohol-water solution. Both the location and the amount of the draws are adjusted so that on dilution with water in an oil washer, the mixture separates into two liquid phases. The upper phase constitutes the impurities "make" and is withdrawn from the system as an oil containing not more than about 8 wt. percent alcohol. The lower phase, containing the balance of the alcohol in dilute aqueous solution, together with the soluble fraction of the impurities in the feed stream, is returned to the extractive distillation tower 10 for clean-up.

Direct steam heating is used in all three towers which are operated at substantially atmospheric pressure. Under these conditions the system gives an alcohol recovery of 98.5%, as first-grade alcohol, at a steam usage of about 46 lbs./gal. of 192° proof spirit.

the line 70 and is condensed at this pressure in the reboiler 71 at the base of the rectifying tower 22, thus partially supplying the heat requirements for this tower, before the condensate is fed to the impurities concentrating tower 42 through the line 73.

The impurities concentrating tower 42 operates at a pressure level of approximately 100 lbs./sq. in. gauge and its overhead vapors are removed through the line 74 and condensed in the reboiler 76 at the rectifying tower 22, thereby furnishing essentially the balance of the heat requirement for this tower. The rectifying tower 22 operates at substantially atmospheric pressure, and except for the indirect heating means (reboilers) at the base, its operation is identical to that of its counterpart in Examples I and II. The alcohol product removed through the line 24 from tower 22 comprises about 94.58 wt. percent ethanol.

Because of the extremely low level of impurities in the feed stream, the system gives an alcohol recovery approaching 99% as first-grade alcohol and operates with a steam usage of about 25 lbs. per gallon of 192° proof spirits, the improvement of steam usage over Examples I and II being the result of the multiple pressure operation.

In Table I below the concentration and purity of the ethanol products recovered in Examples I, II, and III are compared with the typical results from a conventional Barbet refining system. Table II below shows a similar comparison of the alcohol recovery and steam consumption.

TABLE I

|  | Conventional | Example I | Example II | Example III |
|---|---|---|---|---|
| Wt. percent alcohol (60° F./60° F.) | 93.85 | 93.85 | 94.58 | 94.58 |
| Acidity, as acetic acid [1] | 1.2 | 0.82 | 0.93 | 0.5 |
| Esters, as ethyl acetate [1] | 1.6 | 0.27 | 0.48 | 0.3 |
| Aldehydes, as acetaldehyde [1] | 0.8 | 0.09 | 0.45 | 0.1 |
| Fusel oil, as iso-amyl alcohol [1] | 4.0 | 2.9 | 4.13 | 3.0 |
| Non-volatiles [1] | 2.0 | <2.0 | <2.0 | 1.0 |
| Permanganate time (min.) | 30 | 53 | 44 | 50 |

[1] Grams/100 liters (max.).

TABLE II

|  | Conventional | Example I | Example II | Example III |
|---|---|---|---|---|
| Alcohol recovery percent as first-grade product | 90 | 98.5 | 96.5 | 99 |
| Steam consumption (lbs./gal., 192° proof spirits) | 60 | 46 | 52 | 25 |

EXAMPLE II

In the production of ethyl alcohol from sugar cane molasses, the distillation system of FIG. 1 is again employed. The system operates under conditions essentially paralleling those of Example I, except that the feed stream to the extractive distillation tower 10 is approximately 2.5 gallons per minute with all other flows, except steam, reduced correspondingly. The alcohol product removed through line 24 from the tower 22 comprises about 94.58 wt. percent ethanol. The system gives an alcohol recovery of 96.5% as first-grade alcohol at a steam usage of about 52 lbs. of steam per gallon of 192° proof spirits.

EXAMPLE III

In the synthesis of ethyl alcohol from ethylene, there is produced a crude alcohol stream containing approximately 12 wt. percent ethanol together with trace amounts of impurities. The distillation system of FIG. 2 is employed.

The aqueous impure alcohol stream from the synthesis system is fed to an intermediate tray of the extractive distillation tower 10 at a rate of approximately 250 gallons per minute. Extraction water from the base of the rectifying tower 22 is fed to the top tray of the tower 10 at a rate sufficient to allow withdrawal through the line 14 of an aqueous alcohol bottoms stream containing about 8 wt. percent alcohol. Operation of this tower is analogous to its counterpart in Examples I and II except that the operating pressure level is maintained at about 75 lbs./sq. in. gauge. The overhead vapor, containing essentially all of the impurities, is removed through From the foregoing comparisons, the advantages of the invention will be readily understood.

Although the invention has been described above with particular reference to the recovery of ethanol and in connection with certain specific process flow systems, it will be understood that various modifications and equivalents may be utilized without departing from the scope of the invention as defined in the appended claims.

We claim:
1. An improved process for the purification of crude alcohol-containing mixtures which comprises:
   introducing into the middle portion of a first distillation tower comprising an extraction distillation zone a feed stream containing a saturated aliphatic alcohol having not more than 3 carbon atoms and associated lower boiling and higher boiling impurities;
   introducing water into the upper portion of said first distillation tower;
   removing an overhead stream from said first distillation tower containing substantially all of said impurities;
   withdrawing from the bottom of said first distillation tower a dilute aqueous stream containing said alcohol at a concentration of from about 5 wt. percent to about 10 wt. percent and also containing minor amounts of said lower boiling and said higher boiling impurities;
   introducing said dilute aqueous stream withdrawn from the bottom of said first distillation tower into a second distillation tower comprising a rectifying or alcohol concentrating zone;

withdrawing and recovering from the upper portion of said second distillation tower an alcohol product stream comprising said alcohol in highly concentrated and purified form;

withdrawing from said second distillation tower an overhead purge stream containing said lower boiling impurities;

withdrawing from an intermediate portion of said second distillation tower at least one purge stream containing said higher boiling impurities;

introducing into a third distillation tower comprising an impurities concentrating zone said purge streams from said second distillation tower and said overhead stream from said first distillation tower;

withdrawing from said third distillation tower said lower boiling and said higher boiling impurities; and withdrawing from said third distillation tower an alcohol-containing stream and recycling the same to said first distillation tower in combination with said feed stream.

2. The process of claim 1 further characterized in that the alcohol contained in said feed stream comprises ethanol.

3. The process of claim 1 further characterized in that said lower boiling impurities are recovered from an overhead stream withdrawn from said third distillation tower and said higher boiling impurities are recovered from at least one stream withdrawn from an intermediate portion of said third distillation tower.

4. The process of claim 1 further characterized in that a stripped water stream is withdrawn from the bottom of said second distillation tower and is recycled to the upper portion of said first distillation tower.

5. The process of claim 1 further characterized in that a stripped water stream is withdrawn from the bottom of said third distillation tower and is recycled to the upper portion of said first distillation tower.

6. The process of claim 1 further characterized in that each of said purge streams is withdrawn from said second distillation tower in an amount of from about 0.1 to about 5 wt. percent of said recovered alcohol product stream.

7. The process of claim 1 further characterized in that said alcohol-containing stream withdrawn from said third distillation tower and recycled to said first distillation tower contains from about 60 wt. percent to about 90 wt. percent of said alcohol and comprises at least about 80 wt. percent of the alcohol content of the alcohol-containing streams introduced into said third distillation tower.

8. The process of claim 1 further characterized in that each of said distillation towers is operated at substantially atmospheric pressure and is heated by steam.

9. The process of claim 1 further characterized in that at least one of said towers is operated at a higher pressure than another of said towers, and heat is supplied to the lower pressure tower by means of a reboiler utilizing overhead vapors from the higher pressure tower as the source of heat.

10. The process of claim 1 further characterized in that said first and third distillation towers are operated at a relatively high pressure and said second distillation tower is operated at a relatively low pressure, and heat is supplied to said second tower by means of a pair of reboilers utilizing the respective overhead vapors from said first and third towers as the source of heat.

References Cited

UNITED STATES PATENTS

| | | | |
|---|---|---|---|
| 2,610,141 | 9/1952 | Drout | 260—643 |
| 2,638,440 | 5/1953 | Drout et al. | 203—85 |
| 2,801,210 | 7/1957 | Muller et al. | 203—85 |
| 2,806,816 | 9/1957 | Staib et al. | 260—643 |
| 2,910,412 | 10/1959 | Muller et al. | 203—85 |
| 2,993,840 | 7/1961 | Poincet | 203—84 |
| 3,230,156 | 1/1966 | Katzen | 203—93 |
| 3,254,024 | 5/1966 | Huckins et al. | 203—25 |

WILBUR L. BASCOMB, JR., *Primary Examiner.*

U.S. Cl. X.R.

203—26, 27, 78, 79, 80, 84, 85, 98, 99; 260—643